United States Patent
Yun et al.

(10) Patent No.: US 7,418,001 B2
(45) Date of Patent: Aug. 26, 2008

(54) ROUTER FOR SCHEDULING PACKET AND METHOD THEREFOR

(75) Inventors: Bin Yeong Yun, Daejeon (KR); Nam Suk Ko, Daejeon (KR); Whan Woo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 714 days.

(21) Appl. No.: 10/910,812

(22) Filed: Aug. 2, 2004

(65) Prior Publication Data

US 2005/0105532 A1    May 19, 2005

(30) Foreign Application Priority Data

Nov. 13, 2003    (KR) ........................ 10-2003-0080076

(51) Int. Cl.
    *H04J 3/26* (2006.01)
(52) U.S. Cl. ....................................... 370/412; 370/471
(58) Field of Classification Search ................ 370/229, 370/230, 235, 252, 389, 395.21, 411, 412, 370/413, 414, 468, 471
    See application file for complete search history.

(56) References Cited

U.S. PATENT DOCUMENTS

| | | | |
|---|---|---|---|
| 5,173,897 A | | 12/1992 | Schrodi et al. |
| 6,094,435 A | * | 7/2000 | Hoffman et al. ............. 370/414 |
| 6,181,705 B1 | | 1/2001 | Branstad et al. |
| 6,538,989 B1 | * | 3/2003 | Carter et al. ................. 370/229 |
| 7,209,437 B1 | * | 4/2007 | Hodgkinson et al. ........ 370/230 |
| 2001/0036181 A1 | * | 11/2001 | Rogers ........................ 370/389 |
| 2002/0191540 A1 | * | 12/2002 | Fujii et al. ................... 370/229 |
| 2003/0081624 A1 | * | 5/2003 | Aggarwal et al. ............ 370/412 |
| 2003/0152162 A1 | | 8/2003 | Kojima |
| 2007/0104211 A1 | * | 5/2007 | Opsasnick ................... 370/412 |

FOREIGN PATENT DOCUMENTS

| | | |
|---|---|---|
| KR | 1020010070750 | 7/2001 |
| KR | 1020010070750 A | 7/2001 |

OTHER PUBLICATIONS

The Journal of The Korean Institute of Communication Sciences, "Effective Scheduling Algorithm using Queue Separation and Packet Segmation for Jumbo Packets", Bin-Yeong Yun, et al., 13 pages.
The Journal of The Korean Institute of Communication Sciences, "Effective Scheduling Algorithm using Queue Separation and Packet Segmentation for Jumbo Packets", Bin-Yeong Yun, et al., pp. 662-668.

* cited by examiner

*Primary Examiner*—Melvin Marcelo
(74) *Attorney, Agent, or Firm*—Blakely, Sokoloff, Taylor & Zafman LLP (57) ABSTRACT

There are provided a router for scheduling a packet and a method therefor. The stream classifier decides a stream ID of a packet received from an external source on the basis of header information of the packet, and classifies and outputs the packet. The sequence number allocation unit allocates a sequence number to the packet and classifies the packet into a general packet or a jumbo packet according to a length of the packet. The buffer unit includes a pair of a first buffer for storing the general packet and a second buffer for storing the jumbo packet by the number of stream IDs. The scheduler provides a service priority to general packets stored in the first buffer, rather than jumbo packets stored in a second buffer. The order management unit corrects an output order of packets with a same stream ID on the basis of sequence numbers.

13 Claims, 5 Drawing Sheets

ROUTER FOR SCHEDULING PACKET AND METHOD THEREFOR

This application claims the priority of Korean Patent Application No. 2003-80076, filed on Nov. 13, 2003, in the Korean Intellectual Property Office, the disclosure of which is incorporated herein in its entirety by reference.

BACKGROUND OF THE INVENTION

1. Field of the Invention

The present invention relates to a scheduling method available in a router, and more particularly, to a router for efficiently scheduling a packet with a long packet length, such as a jumbogram or a jumbo packet, and a method therefor.

2. Description of the Related Art

Due to development of a high-speed networking technique, a network must transmit a large amount of data exceeding a processing capacity of a computer. To process such a large amount of data at a high speed, a CPU of a computer inevitably consumes many resources, which causes performance deterioration of the computer. To solve such a problem, it is necessary to reduce the number of CPU clock cycles consumed by data processing. An approach for this is to increase the length of a packet.

The length of a Maximum Transmission Unit (MTU) is recommended differently according to a protocol. The MTU represents a maximum size of a packet or frame capable of being transmitted through a packet/frame-based network such as a TCP/IP network. A packet with a maximum length of 64K bytes is used in IPv4 (Internet Protocol version 4). A jumbo frame with a length from 1518 to 9K bytes (maximum) is used in a giga-bit Ethernet. Also, a jumbogram with a length from 64K to 4 giga bytes (maximum) is used in IPv6. Hereinafter, a jumbo frame or a jumbogram with a length exceeding 1500 bytes are referred to as a "jumbo packet", and a packet equal to or smaller than 1500 is referred to as a "general packet".

A representative field in which such jumbo packets are used is a Storage Area Network (SAN) area. Studies into transmission of jumbo packets through a network are currently underway by ETF/DTF, Internet2, DoE, NASA, etc. However, the jumbo packet has shortcomings in compatibility with existing systems, which prevents standardization and spread of the jumbo packet.

Figure 1:
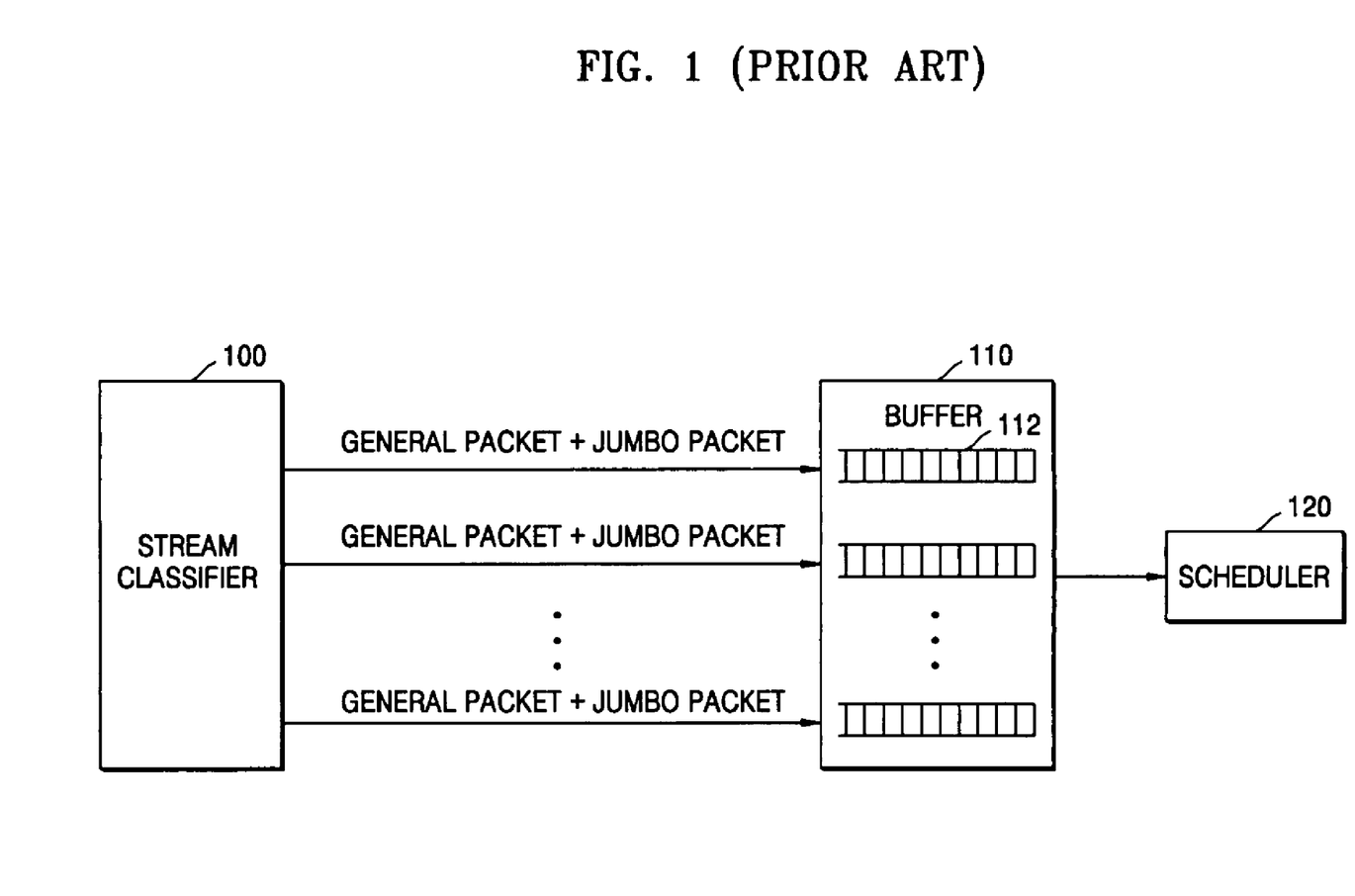
FIG. 1 shows a configuration of a conventional router for scheduling a jumbo packet.

FIG. 1 shows a configuration of a conventional router for scheduling a jumbo packet.

Referring to FIG. 1, a conventional router includes a stream classifier 100, a buffer unit 100 and a scheduler 120.

The stream classifier 100 classifies input packets according to their destination addresses and transfers the classified packets to the buffer unit 110. The buffer unit 110 stores the classified packets separately according to their corresponding destination addresses. Since the conventional router does not classify packets into general packets and jumbo packets, general packets and jumbo packets are mixed and stored in the buffer unit 110. The scheduler 120 decides an output order of packets stored in queues 112 of the buffer unit 110, according to a round-robin method or other scheduling methods, and outputs the packets in the decided output order.

Since the conventional router shown in FIG. 1 performs scheduling without classifying general packets and jumbo packets, packet transmission delay and packet loss may occur. Furthermore, in the case where delay-sensitive packets such as VoIP (Voice of IP) are processed at the same time with jumbo packets, serious packet loss as well as deterioration of service quality of VoIP can occur.

SUMMARY OF THE INVENTION

The present invention provides a router which performs scheduling capable of preventing transmission delay of delay-sensitive packets as well as packet loss by efficiently processing packets, and a scheduling method therefor.

The present invention also provides a computer-readable medium having embodied thereon a computer program for executing a scheduling method which prevents transmission delay of delay-sensitive packets as well as packet loss by efficiently processing packets.

According to an aspect of the present invention, there is provided a router comprising: a stream classifier, which decides a stream ID of a packet received from an external source on the basis of header information of the packet, and classifies and outputs the packet according to the stream ID; a sequence number allocation unit, which allocates a sequence number to the packet and classifies the packet into a general packet or a jumbo packet according to a length of the packet; a buffer unit, which include a pair of a first buffer for storing the general packet and a second buffer for storing the jumbo packet, by the number of stream IDs; a scheduler, which provides a service priority to general packets stored in the first buffer, rather than jumbo packets stored in the second buffer; and an order management unit, which corrects an output order of packets with a same stream ID on the basis of sequence numbers allocated by the sequence number allocation unit.

According to another aspect of the present invention, there is provided a method for scheduling a packet stream with a jumbo packet, the method comprising: deciding a stream ID of a packet received from an external source on the basis of header information of the packet; allocating a sequence number to each of packets with a same stream ID; classifying each of the packets with the same stream ID into a general packet or a jumbo packet on the basis of a length of the packet, and storing the general packet and the jumbo packet separately; providing an output priority to the general packet, rather than the jumbo packet, and deciding an output order of each of the packets; and correcting an output order of each of the packets with the same stream ID on the basis of the allocated sequence numbers.

Therefore, it is possible to prevent transmission delay generated in a router due to packets with a long packet length and ensure service quality of delay-sensitive packets such as VoIP.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a preferred embodiment of the present invention will be described in detail with reference to the appended drawings.

Figure 2:
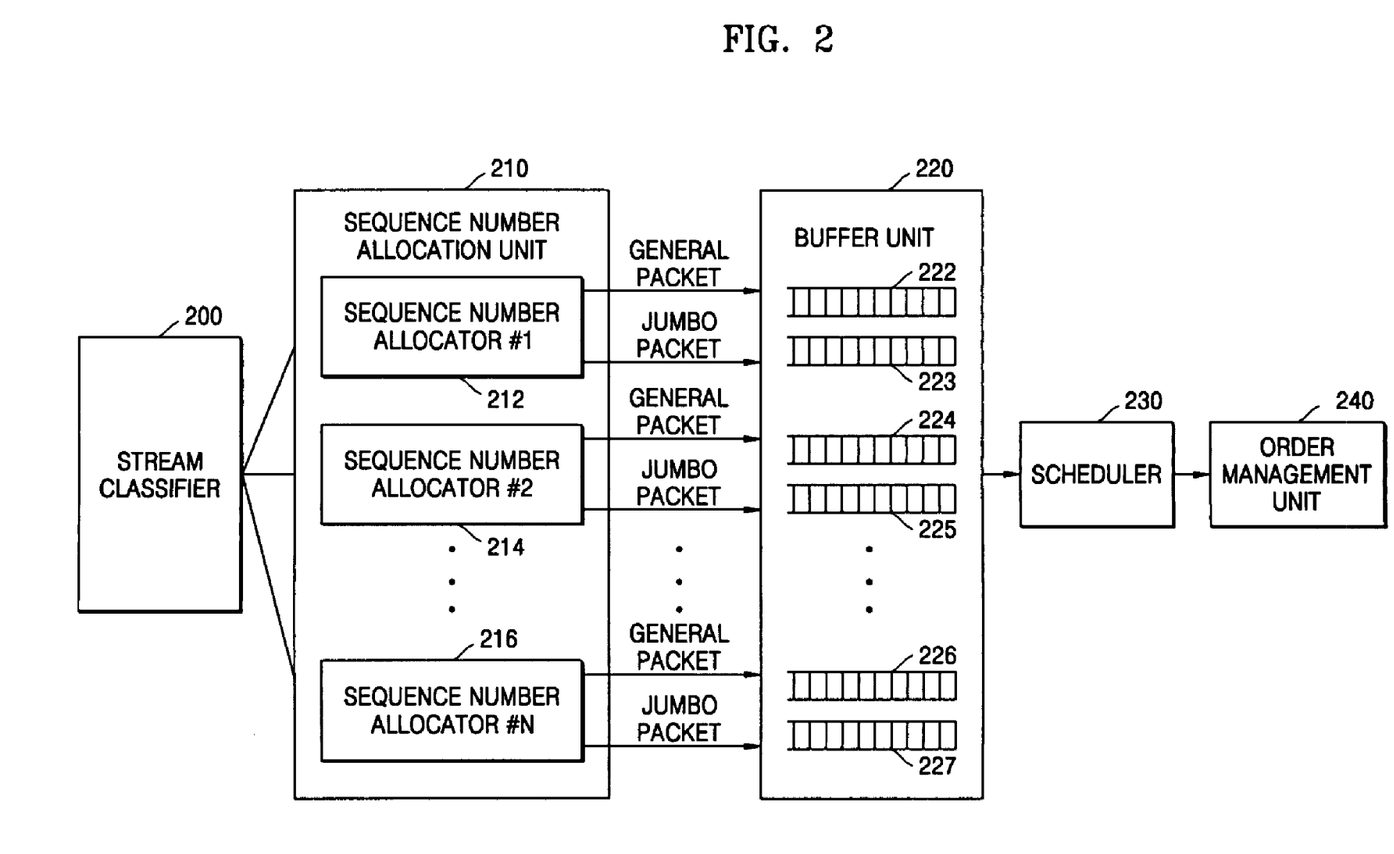
FIG. 2 shows a configuration of a router for scheduling a packet, according to the present invention.

FIG. 2 shows a configuration of a router for scheduling a packet, according to the present invention.

Referring to FIG. 2, the router according to the present invention includes a stream classifier 200, a sequence number allocation unit 210, a buffer unit 220, a scheduler 230, and an order management unit 240. The stream classifier 200 receives a packet and decides a stream ID of the packet on the basis of a source IP address, a destination IP address, a source port number and a destination port number included in a header of the packet.

The stream classifier 200 can decide the stream ID depending on various criterions. For example, the stream classifier 200 can group received packets according to their destination IP addresses and provide a stream IP to each of the groups. Also, the stream classifier 200 can group received packets according to their destination IP addresses and destination port numbers and decide a stream IP for each of the groups. That is, the stream classifier 200 can classify packets into predetermined groups and provide a stream ID to each of the groups, using various methods suited to a corresponding router. The stream ID is an unique identifier for identifying a packet classified according to a classification criterion of the stream classifier.

The sequence number allocation unit 210 includes a plurality of sequence number allocators 212 through 216. The sequence number allocators 212 through 216 are provided per each of the groups classified according to stream IDs, and allocates sequence numbers sequentially to packets output from a same group, that is, packets with a stream ID.

Also, the sequence number allocators 212 through 216 classify a received packet into a general packet or a jumbo packet and transfer the classified packets to the buffer unit 220. The jumbo packet represents a packet with a long packet length and generally has a length exceeding 1500 bytes. The length of the jumbo packet defined in this disclosure can be changed according to a specification of the router.

The buffer unit 220 receives and stores the general packets and the jumbo packets that are classified by the sequence number allocation unit 210. The buffer unit 220 includes first buffers 222, 224 and 226 for storing general packets and second buffers 223, 225 and 227 for storing jumbo packets, wherein corresponding pairs (222,223), (224, 225) and (226, 227) of the first buffers and the second buffers correspond to the respective sequence number allocators 222 through 216, respectively. The buffer unit 220 can divide a single storage area logically into a plurality of sections to construct a plurality of buffers, or can include, as internal buffers, some storage units that are physically independent to each other. The storage unit is a data read/write memory such as RAM, ROM, and a magnetic/optical storage unit.

Also, the buffer unit 220 divides and stores a jumbo packet into segments. As the size of a segment increases, transmission delay of a general packet increases, which causes service deterioration. This transmission delay is dependent on a transmission speed of a physical link. Accordingly, a division size of a jumbo packet, that is, a segment size is decided according to a transmission speed of a physical link of a router. The jumbo packet is scheduled per a segment unit.

The jumbo packet is divided into segment units and stored by the buffer unit 220 and then is serviced according to a scheduling method according to the present invention. Or, the jumbo packet is stored without any division in the buffer unit 220 and then is divided into segments by the scheduler 230.

The scheduler 230 decides an output order of packets stored in the respective buffers 222 through 227 of the buffer unit 220. The scheduler 230 provides a service priority to a general packet, rather than a jumbo packet. Accordingly, after the scheduler 230 completely performs scheduling of all general packets, the scheduler 200 performs scheduling of a jumbo packet. The scheduler 230 performs the scheduling using a round-robin method. Accordingly, the scheduler 230 performs scheduling of general packets with a priority using the round-robin method and then performs scheduling of a jumbo packet. The scheduler 230 can use other scheduling methods.

Since the scheduler 230 provides a service priority to general packets rather than jumbo packets, the scheduler 230 performs scheduling of jumbo packets which are in a standby state in the buffers 223, 225 and 227 after all general packets which are in a standby state in the buffers 222, 224 and 226 are serviced completely. Here, the jumbo packet is serviced per a segment unit.

Accordingly, the scheduler 230 performs scheduling of a segment of a jumbo packet and successively checks whether or not a general packet exists in the buffers 222, 224 and 226 for storing general packets. If a general packet exists in the buffers 222, 224 and 226, the scheduler 230 performs scheduling of the general packet. That is, since the scheduler 230 provides a service priority to a general packet rather than a jumbo-packet, packets of VoIP can be processed efficiently without delay. When the scheduler 230 services a jumbo-packet per a segment unit, the scheduler 130 checks whether or not a segment to be a service object is a final segment of the jumbo packet. If the segment is a final segment of the jumbo packet, the scheduler 230 holds a following jumbo packet to be scheduled.

The order management unit 240 corrects an output order of packets with the same stream ID among packets scheduled and output by the scheduler 230. According to the present invention, even packets with the same stream ID can be classified into general packets and jumbo packets and stored in different areas of the buffer 220. Since the scheduler 230 first performs scheduling of the general packets regardless of the stream ID, the output orders of the packets with the same stream ID can be reversed. Thus, the order management unit 240 corrects the output orders of the packets with the same stream ID so that the packets can be output in the order of when they input to the router.

Also, the order management unit 240 reconstructs segments of the jumbo packet serviced by the scheduler 230. That is, the order management unit 240 reconstructs the jumbo packet divided into the segments and outputs the jumbo packet.

Generally, in a case of a UDP (User Data Protocol) service, a reversed packet order causes no problem, however, in a case of TCP (Transmission Control Protocol) service, a packet order must not be reversed.

For example, it is assumed that packets with the same stream ID are three packets which are input to the router in an order of a first general packet, a first jumbo packet and a second general packet. The first general packet and the second general packet are stored in the buffer 222 for storing general packets and the first jumbo packet is stored in the buffer 223 for storing jumbo packets, respectively.

Since the scheduler 230 performs priority scheduling of the general packets, the packets are output from the scheduler 230 in an order of the first general packet, the second general packet and the first jumbo packet. That is, the output order of the packets subjected to scheduling is different from the receipt order of the packets to the router. Since the scheduler 230 divides the first jumbo packet into segments and performs a service per a segment, output delay of general packets stored in buffers 224 through 227 each corresponding to a different stream ID can be prevented.

To correct the output order of the packets, the sequence number allocation unit 210 allocates a sequence number 1 to the first general packet, a sequence number 2 to the first jumbo packet and a sequence number 3 to the second general packet, respectively. Therefore, the sequence number allocation unit 210 corrects the output order of the packets output in the reversed order from the scheduler, using the allocated sequence numbers. Thus, the sequence number allocation unit 210 outputs the packets in an order of the first general packet, the first jumbo packet and the second general packet.

Since the first jumbo packet is scheduled per a segment, a final segment of the first jumbo packet may not be output from the scheduler 230 even after both the first general packet and the second general packet are output from the scheduler 230. In this case, when the order management unit 240 receives the final segment of the first jumbo packet after outputting the first general packet, the order management unit 240 reconstructs the first jumbo packet. Then, the order management unit 240 outputs the first jumbo packet and the second general packet in this order.

In the above example, if a general packet requiring a service priority, such as VoIP, is stored in the buffer while the scheduler 230 performs scheduling of the first jumbo packet, the scheduler 230 performs scheduling of the general packet prior to the first jumbo packet. The scheduler 230 checks whether a general packet is in a standby state in the buffer for storing general packets whenever performing scheduling of the first jumbo packet per a segment unit. If a general packet is in the standby state, the scheduler 230 performs priority scheduling of the general packet, thereby preventing service delay of general packets and improving service quality.

In particular, since packets including jumbo packets are generally aimed to transmit a large amount of data and not aimed to transmit data in real time, transmission delay of streams including jumbo packets is not important. It is only necessary to construct and transmit streams sensitive to transmission delay in a form of general packets.

Figure 3A:
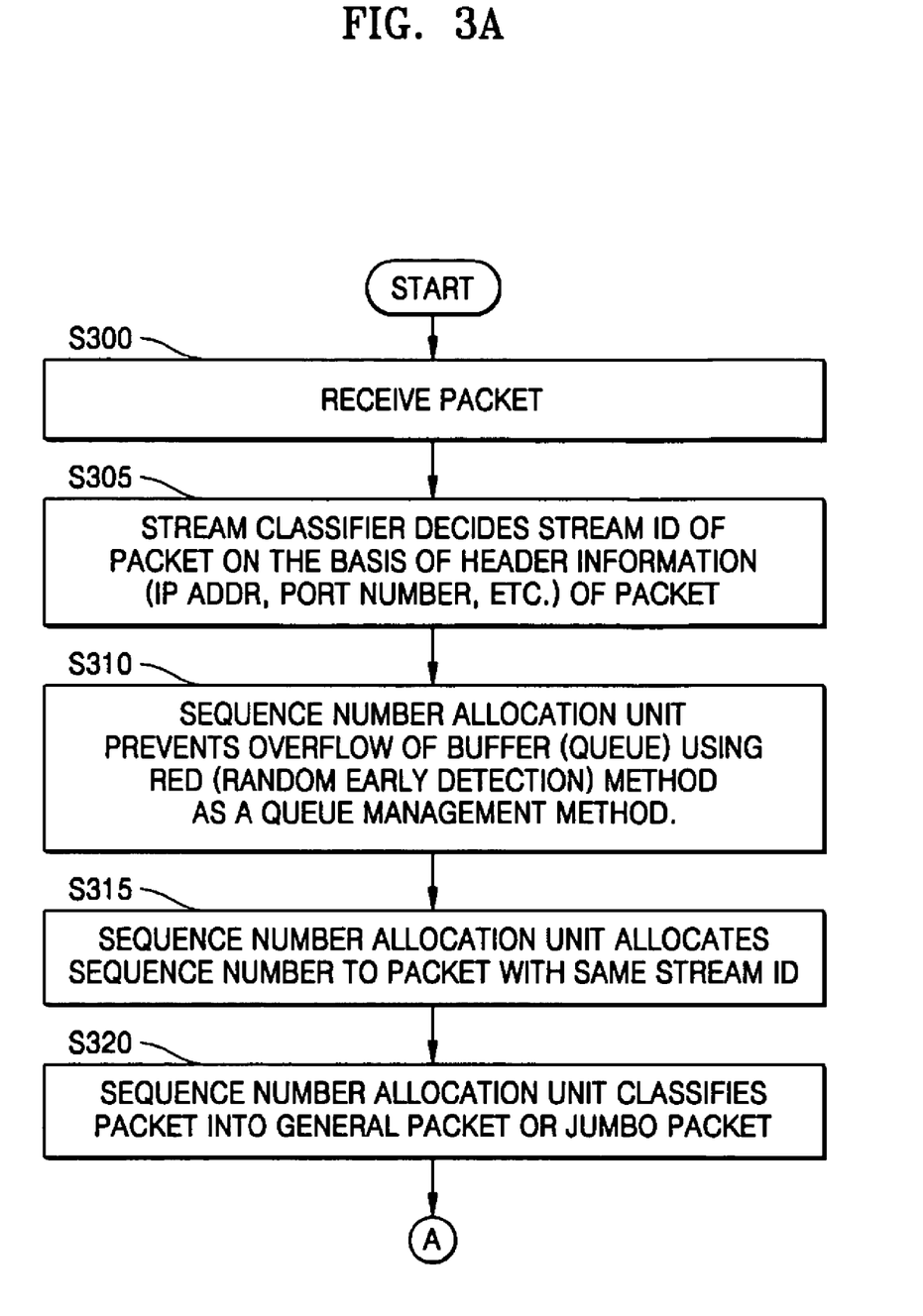
FIG. 3 is a flowchart illustrating a packet scheduling method according to the present invention.
Figure 3B:
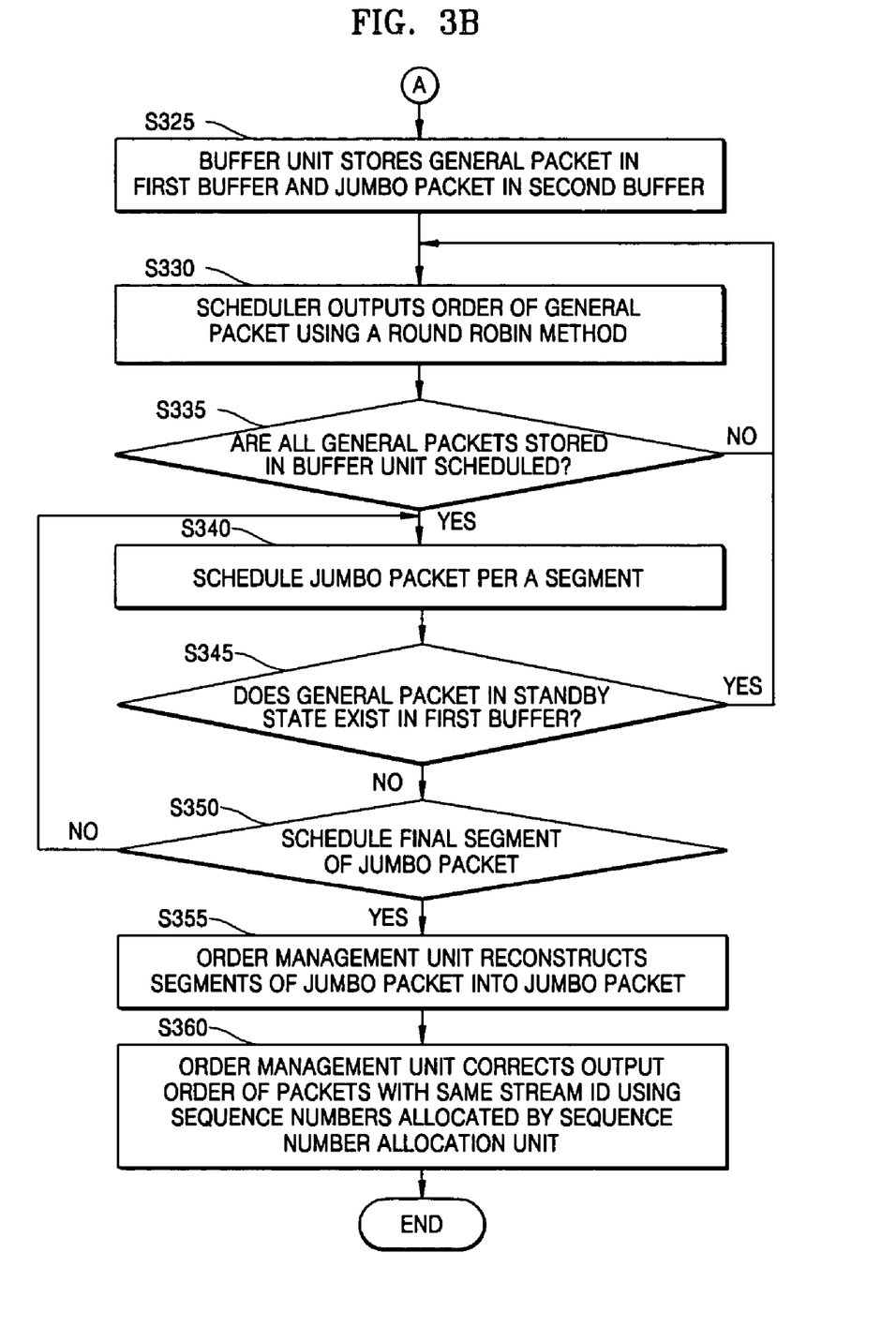

FIG. 3 is a flowchart illustrating a packet scheduling method according to the present invention.

Referring to FIG. 3, the stream classifier 200 receives a packet over a network in step 300. Then, the stream classifier 200 decides a stream ID of the received packet based on header information of the packet in step S305. The stream ID is an identifier number provided for identify a packet classified according to a predetermined criterion. For example, the stream classifier 200 classifies packets into groups on the basis of a destination IP address and a port number among the header information of the packet, and provides a stream ID to each of the groups. The classification criterion by the stream classifier 200 can be changed variously on the basis of header information of a packet.

The sequence number allocation unit 210 prevents overflow of buffers by applying a Random Early Detection (RED) method, as a buffer (queue) management method, to each of packets classified according to stream IDs and stored in corresponding buffers, in step S310.

The RED method informs a corresponding device of a congestion state by in advance dropping a corresponding packet intentionally and randomly before a buffer is overflowed or marking a specific bit in a header portion of the corresponding packet. That is, the RED method determines whether to store a packet in a queue or drop the packet, by calculating an average buffer (queue) size and comparing the average buffer size with two predetermined threshold values (maximum value and minimum value).

The sequence number allocation unit 210 allocates sequence numbers to the packets classified according to the stream IDs. The sequence numbers allocated to the packets are used for correcting an output order of the packets when the packets with the same stream ID are received in a reversed order. Also, the sequence number allocation unit 210 classifies received packets into general packets and jumbo packets in step 320.

The buffer unit 220 stores the general packets and the jumbo packets in the first buffers 222, 224 and 226 and the second buffers 223, 225 and 227, respectively, in step S325. Also, the buffer unit 220 divides and stores a jumbo packet into segments. By dividing a jumbo packet into segment units and performing scheduling of each segment, delay due to scheduling of a jumbo packet with a long packet length can be prevented. Also, by allowing scheduling of a general packet whenever terminating scheduling of a segment, general packets can be output without any delay.

The scheduler 230 decides an output order of packets, which are classified according to stream IDs classified into general packets and jumbo packets, and stored in the first buffers 222, 224 and 226 and the second buffers 223, 225 and 227, respectively, in step S330. The scheduler 230 provides a priority to general packets. Accordingly, the scheduler 230 primarily perform scheduling of general packets in step S330.

The scheduler 230 decides an output order of the general packets, using a round robin method. Of cause, the scheduler 230 can decide the output order of the general packets using other various scheduling methods.

When the scheduler 230 completely performs scheduling of all the general packets stored in the buffer unit 220 in step S335, the scheduler 230 performs scheduling of a jumbo packet in step S340. The scheduler 230 schedules the jumbo packet per a segment unit in step S340. If it is detected that a general packet exists in the buffer unit 220 in step S345 while the scheduler 230 schedules a segment of the jumbo packet, the scheduler 230 performs scheduling of the general packet prior to the corresponding segment of the jumbo packet.

Whether the scheduler 230 terminates a segment of the jumbo packet, the scheduler 230 checks whether a general packet is stored in a standby state in the buffer unit 220 in step S340. If a general packet is in the standby state in the buffer unit, the scheduler 230 performs scheduling of the general packet. By allowing priority scheduling of a general packet through checking of a standby state of a general packet, while scheduling a jumbo packet per a segment unit, it is possible to prevent general packets from being delayed.

After the scheduler 230 performs scheduling of a final segment of a jumbo packet in step S350, the order management unit 240 reconstructs the jumbo packet scheduled per segments in step 355.

The order management unit 240 corrects an output order of packets with the same stream ID, according to the sequence numbers allocated by the sequence number allocation unit 210, in step S360. In a case of a stream including both general packets and jumbo packets, there can occur a situation where the order of packets input to the router is different from the output order of the packets decided by the scheduler, due to the scheduling method that provides a priority to general packets. To solve this problem, the sequence number allocation unit 210 allocates sequence numbers to packets and the order management unit 240 corrects an output order of the packets based on the sequence numbers.

Figure 4:
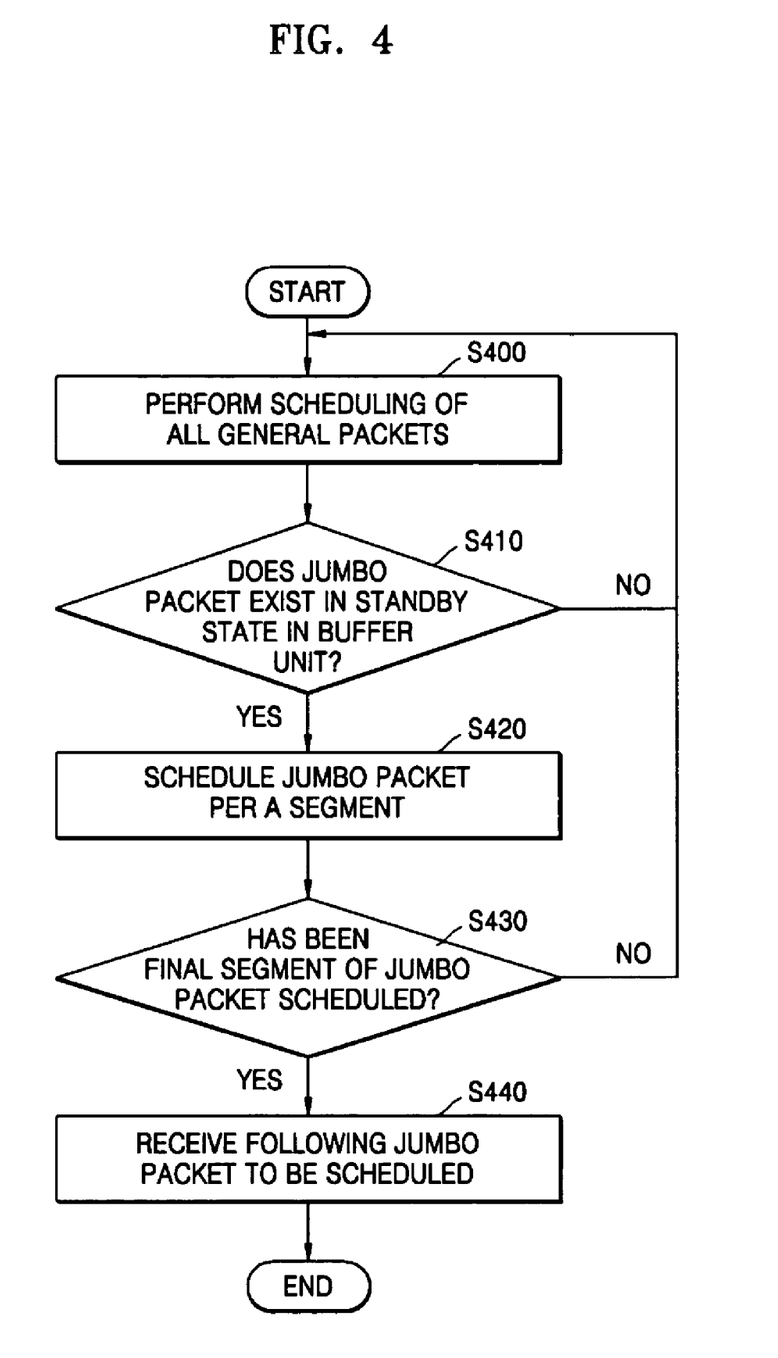
FIG. 4 is a flowchart illustrating a packet scheduling method in terms of a jumbo packet.

FIG. 4 is a flowchart illustrating a packet scheduling method in terms of a jumbo packet.

Referring to FIG. 4, the scheduler 230 performs priority scheduling of general packets rather than jumbo packets in step S400. After the scheduler 230 terminates scheduling of all general packets in step S410, the scheduler 230 checks whether a jumbo packet in a standby state exists in the buffer unit 220 in step S410. If a jumbo packet in a standby state exists in the buffer unit 220 in step S410, the scheduler 230 schedule segments of the jumbo packet individually in step S420.

If the scheduler 230 has performed scheduling of a final segment of the jumbo packet in step S430, the scheduler 230 receives a following jumbo packet to be scheduled in step S440. If a segment scheduled just before is not a final segment of the jumbo packet in step S430, the scheduler 230 performs scheduling of a general packet, and again performs scheduling of the jumbo packet in step S420 when scheduling of all the general packets is complete in step S400.

The present invention may be embodied as a program stored on a computer readable medium that can be run on a general computer. Here, the computer readable medium includes but is not limited to storage media such as magnetic storage media (e.g., ROM's, floppy disks, hard disks, etc.), optically readable media (e.g., CD-ROMs, DVDs, etc.), and carrier waves (e.g., transmission over the Internet). The present invention may also be embodied as a computer readable program code unit stored on a computer readable medium, for causing a number of computer systems connected via a network to affect distributed processing.

As described above, it is possible to prevent transmission delay generated in a router due to packets with a long packet length and ensure service quality of delay-sensitive packets such as VoIP (Voice of IP). Also, it is possible to efficiently prevent packet loss by classifying packets into general packets and jumbo packets and storing the general packets and the jumbo packets in different areas.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A router comprising: a stream classifier, which determines a stream ID of a packet received from an external source on the basis of header information of the packet, classifies and outputs the packet according to the stream ID;
   a sequence number allocation unit, which allocates a sequence number to the packet and classifies the packet as a general packet or a jumbo packet according to a length of the packet;
   a buffer unit, which include a pair of a first buffer for storing the general packet and a second buffer for storing the jumbo packet, by the number of stream IDs;
   a scheduler, which provides a service priority to general packets stored in the first buffer, higher than jumbo packets stored in the second buffer; and
   an order management unit, which corrects an output order of packets with a same stream ID on the basis of sequence numbers allocated by the sequence number allocation unit.

2. The router of claim 1, wherein the header information of the packet includes a source IP address, a destination IP address, a source port number, and a destination port number, and
   the stream classifier determines a stream ID of each packet on the basis of the source IP address, the destination IP address, the source port number and the destination port number.

3. The router of claim 1, wherein the sequence number allocation unit decides whether to store or drop the packet output from the stream classifier using a RED (Random Early Detection) buffer management as a buffer management method.

4. The router of claim 1, wherein the buffer unit divides and stores the jumbo packet into segments, and the order management unit reconstructs the segments into the jumbo packet.

5. The router of claim 1, wherein the order management unit outputs a general packet and jumbo packet with a same stream ID sequentially, according to sequence numbers allocated to each of the general packet and jumbo packet by the sequence number allocation unit.

6. The router of claim 1, wherein the scheduler determines an output order of the general packet using a round-robin method, and performs scheduling of the jumbo packet per a segment when all general packets stored in the buffer unit are serviced.

7. A method for scheduling a packet stream with a jumbo packet, the method comprising:
   determines a stream ID of a packet received from an external source on the basis of header information of the packet;
   allocating a sequence number to each of packets with a same stream ID;
   classifying each of the packets with the same stream ID into a general packet or a jumbo packet on the basis of a length of the packet, and storing the general packet and the jumbo packet separately;
   providing an output priority to the general packet, rather than the jumbo packet, and determines an output order of each of the packets; and
   correcting an output order of each of the packets with the same stream ID on the basis of the allocated sequence numbers.

8. The method of claim 7, wherein the header information of the packet includes a source IP address, a destination IP address, a source port number, and a destination port number, and
   the determining the stream ID is to assign a stream ID for each of the packets on the basis of the source IP address, the destination IP address, the source port number and the destination port number.

9. The method of claim 7, before the allocating the sequence number, further comprising:
   determining whether to store or drop the packet using a RED (Random Early Detection) method as a buffer management method.

10. The method of claim 7, wherein the allocating the sequence number comprises dividing the jumbo packet into segments, and the correcting the output order comprises reconstructing the segments into the jumbo packet.

11. The method of claim 7, wherein the correcting the output order is to output the general packet and jumbo packet with the same stream ID sequentially according to a sequence number allocated to each of the general packet and jumbo packet.

12. The method of claim 7, wherein the deciding the output order is to determine an output order of the general packet using a round-robin method and perform scheduling of the jumbo packet per a segment when all general packets stored in the buffer unit are serviced.

13. A computer-readable medium having embodied thereon a computer program for executing a method for scheduling a packet stream with a jumbo packet, the method comprising:

determining a stream ID of a packet received from an external source on the basis of header information of the packet;

allocating a sequence number to each of packets with a same stream ID;

classifying each of the packets with the same stream ID into a general packet or a jumbo packet on the basis of a length of the packet, and storing the general packet and the jumbo packet separately;

providing an output priority to the general packet, higher than the jumbo packet, and determining an output order of each of the packets; and correcting an output order of the packets with the same stream ID on the basis of the allocated sequence number.

* * * * *